United States Patent [19]

Sugahara et al.

[11] Patent Number: 5,561,719
[45] Date of Patent: Oct. 1, 1996

[54] ADAPTIVE QUANTIZATION APPARATUS

[75] Inventors: Takayuki Sugahara; Kenji Sugiyama; Ichiro Ando, all of Yokosuka, Japan

[73] Assignee: Victor Company of Japan, Ltd., Yokohama, Japan

[21] Appl. No.: 971,132

[22] Filed: Nov. 4, 1992

[30] Foreign Application Priority Data

Nov. 15, 1991 [JP] Japan ..................... 3-326851

[51] Int. Cl.$^6$ ................................... G06K 9/36
[52] U.S. Cl. .............................. 382/50; 358/430
[58] Field of Search ................ 382/50, 30; 358/133, 358/136, 138, 261.2, 430, 466; 375/122, 27; 364/715.02, 745; 548/405, 394

[56] References Cited

U.S. PATENT DOCUMENTS

| | | | |
|---|---|---|---|
| 4,125,861 | 11/1978 | Mounts et al. | 358/133 |
| 4,366,507 | 12/1982 | Mori | 358/283 |
| 4,725,885 | 2/1988 | Gonzales et al. | 358/135 |
| 5,016,010 | 5/1991 | Sugiyama | 341/67 |
| 5,025,482 | 1/1991 | Murakami et al. | 382/56 |
| 5,063,608 | 11/1991 | Siegel | 382/56 |
| 5,117,287 | 5/1992 | Koike et al. | 358/133 |
| 5,121,216 | 6/1992 | Chen et al. | 358/261.3 |
| 5,144,426 | 9/1992 | Tanaka et al. | 358/133 |
| 5,170,264 | 12/1992 | Saito et al. | 358/433 |

FOREIGN PATENT DOCUMENTS

| | | |
|---|---|---|
| 0379217 | 7/1990 | European Pat. Off. . |
| 0380081 | 8/1990 | European Pat. Off. . |
| 0444918 | 9/1991 | European Pat. Off. . |
| 0493136 | 7/1992 | European Pat. Off. . |
| 3940554 | 6/1990 | Germany . |
| 58-32824 | 7/1983 | Japan . |

*Primary Examiner*—Joseph Mancuso
*Attorney, Agent, or Firm*—Lowe, Price, LeBlanc & Becker

[57] ABSTRACT

There is a signal representing an original image. A device generates a signal representing a predicted image original image. A subtracter derives a difference between the original-image signal and the predicted-image signal, and outputs the derived difference as a prediction error signal. The prediction error signal is transformed into a transform-resultant signal. The transform-resultant signal is quantized with quantization characteristics. An activity of the original image is derived from the original-image sign. An activity is derived from the prediction error signal. The quantization characteristics are controlled in response to both the original-image activity and the prediction-error activity.

9 Claims, 6 Drawing Sheets

RAP OPERATOR

| -1 | -1 | -1 |
|----|----|----|
| -1 | 8  | -1 |
| -1 | -1 | -1 |

MEAN OPERATOR

| 1 | 1 | 1 |
|---|---|---|
| 1 | 8 | 1 |
| 1 | 1 | 1 |

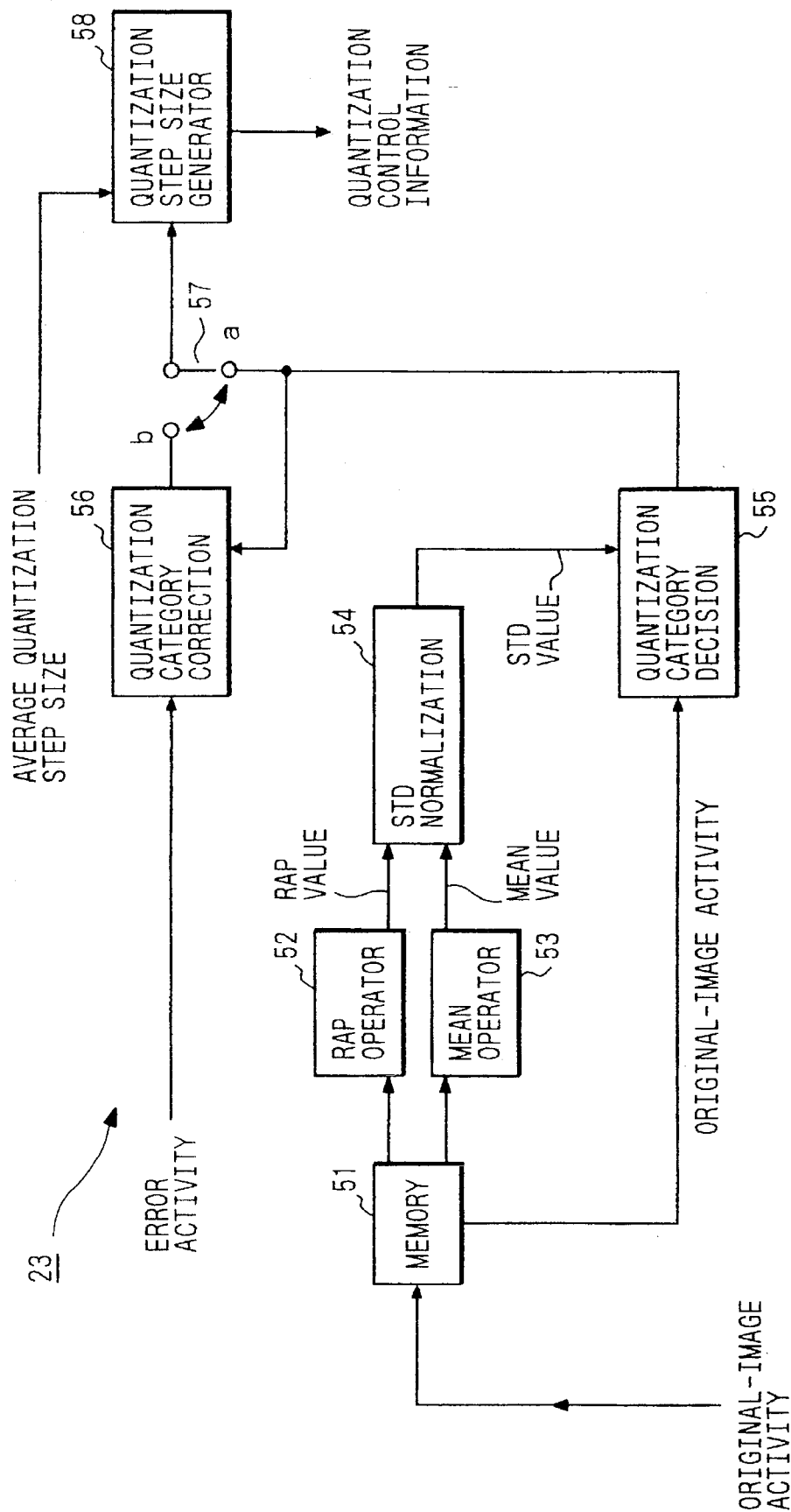

ADAPTIVE QUANTIZATION APPARATUS

BACKGROUND OF THE INVENTION

This invention relates to an adaptive quantization apparatus in a predictive encoding system or a data compression system for a signal representing a moving image.

In transmission of data representing a moving image, it is desirable to compress the image data or to reduce the number of bits representing the image data without appreciably lowering the quality of the transmitted image. Quantizing image data enables compression of the image data. Predictive encoding of image data also enables compression of image data.

As will be described later, prior art image-signal encoding apparatus have some problems.

SUMMARY OF THE INVENTION

It is an object of this invention to provide an improved adaptive quantization apparatus.

This invention provides an adaptive quantization apparatus for processing a signal representing an original image which comprises means for generating a signal representing a predicted image for the original image; means for deriving a difference between the original-image signal and the predicted-image signal, and outputting the derived difference as a prediction error signal; means for transforming the prediction error signal into a transform-resultant signal; means for quantizing the transform-resultant signal with variable quantization characteristics; means for deriving an activity of the original image from the original-image signal; means for deriving an activity from the prediction error signal; and means for controlling the quantization characteristics in response to both the original-image activity and the prediction-error activity.

BRIEF DESCRIPTION OF THE DRAWINGS

FIG. 5 is a block diagram of the quantization step size deciding circuit in the image-signal encoding apparatus of FIG. 4.

DESCRIPTION OF THE PREFERRED EMBODIMENT

Prior art image-signal encoding apparatus will now be described for a better understanding of this invention.

Figure 1:
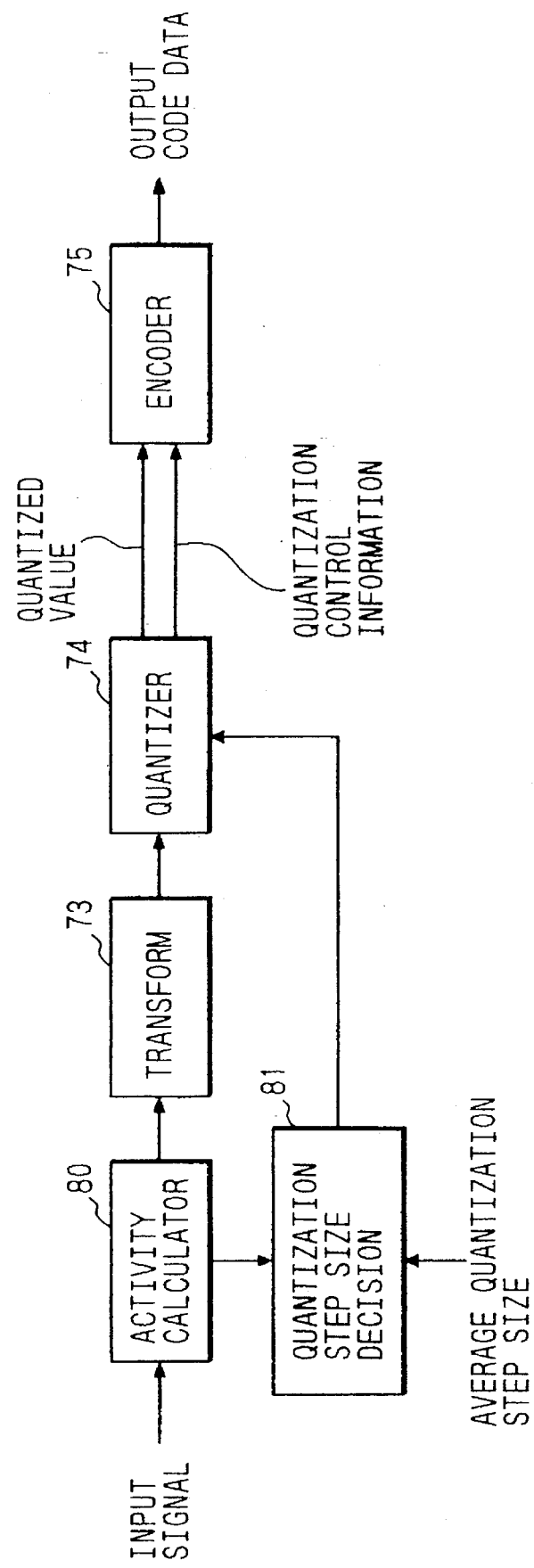
FIG. 1 is a block diagram of a first prior art image-signal encoding apparatus.

FIG. 1 shows a first prior art image-signal encoding apparatus which includes an activity calculator 80 receiving an input image signal. The activity calculator 80 calculates an activity of an image represented by the input signal. The activity is a quantity representing a complexity of the image. The activity calculator 80 informs a quantization step size deciding circuit 81 of the calculated activity.

The quantization step size deciding circuit 81 receives information of an average quantization step size from an encoding controller (not shown). This circuit 81 decides a quantization step size on the basis of the average quantization step size and the activity for each macro-block having, for example, 16 by 16 pixels. Thus, the decided quantization step size depends on the activity. The quantization step size deciding circuit 81 informs a quantizer 74 of the decided quantization step size as quantization control information.

In addition, the input image signal is subjected to orthogonal transform by a circuit 73. The orthogonal transform circuit 73 outputs data representative of transform coefficients to the quantizer 74. The quantizer 74 quantizes the transform coefficient data with the quantization step size informed by the quantization step size deciding circuit 81. The quantizer 74 outputs quantization-resultant data and the quantization control information to an encoder 75. The quantization-resultant data and the quantization control information are encoded by the encoder 75 into corresponding words of given-format code. The encoder 75 outputs the code words.

Figure 2:
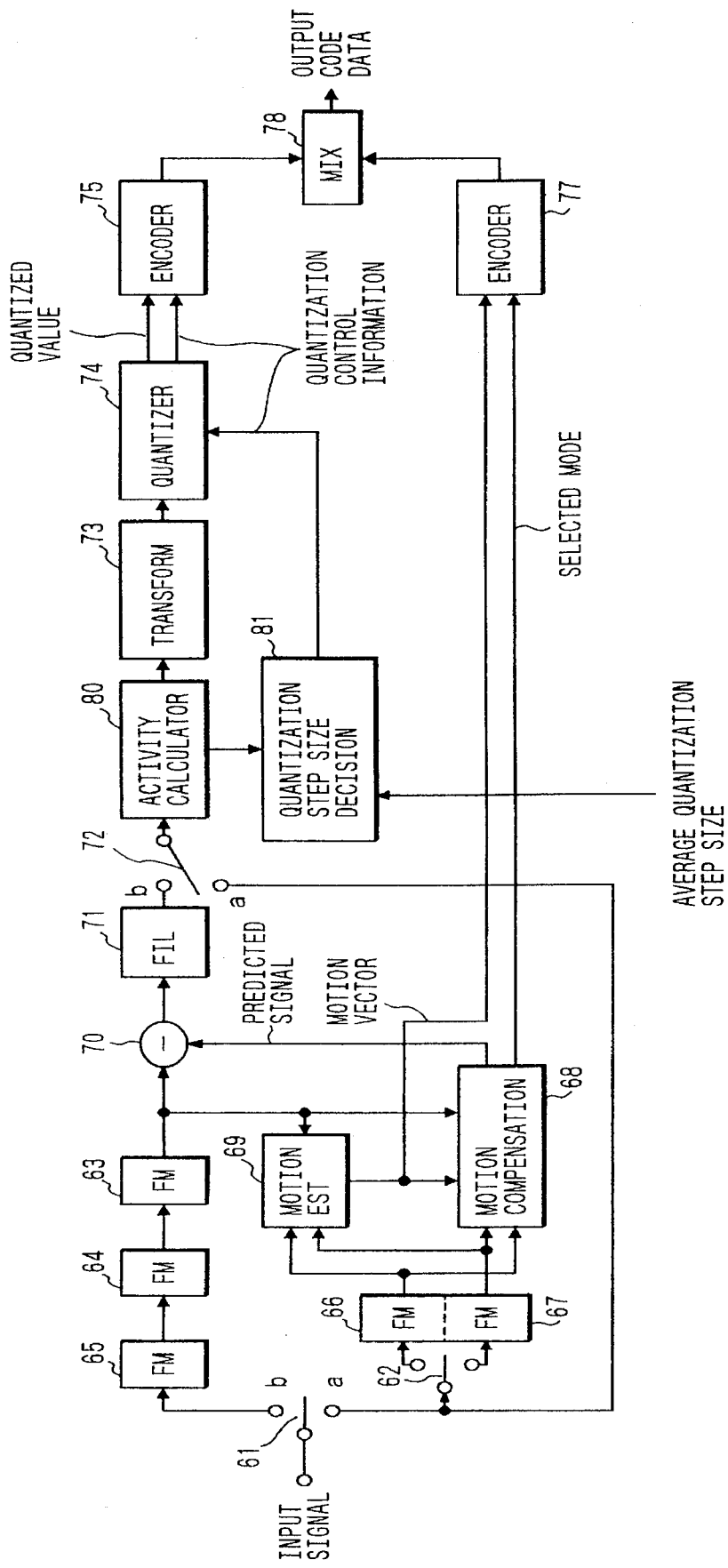
FIG. 2 is a block diagram of a second prior art image-signal encoding apparatus.
Figures 3, 6, 7:
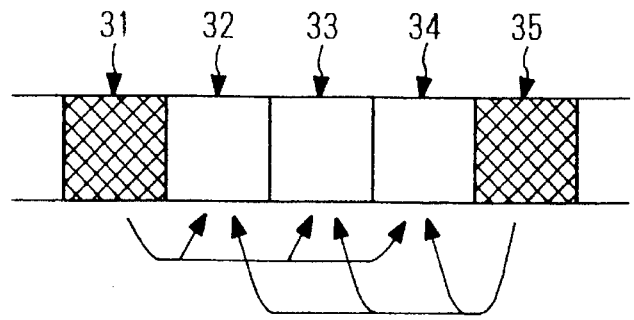
FIG. 3 is a diagram of image-signal frames of different types in the prior art image-signal encoding apparatus of FIG. 2.
FIG. 6 is a diagram of a RAP operator used in decision of a quantization category in the image-signal encoding apparatus of FIG. 4.
FIG. 7 is a diagram of a MEAN operator used in decision of a quantization category in the image-signal encoding apparatus of FIG. 4.

FIG. 2 shows a second prior art image-signal encoding apparatus which is of a predictive encoding type. The prior art apparatus of FIG. 2 executes such encoding that, as shown in FIG. 3, reference frames 31 and 35 are set every four frames in a frame sequence and images in the reference frames 31 and 35 are subjected to intra-frame encoding. In addition, images in frames 32, 33, and 34 between the reference frames 31 and 35 are subjected to inter-frame encoding. Frames between reference frames are referred to as non-reference frames.

The prior art apparatus of FIG. 2 includes switches 61 and 72 each having a movable contact and fixed contacts "a" and "b". During a period where an input signal represents an image in a reference frame (a frame 31 or 35 in FIG. 3), the movable contacts of the switches 61 and 72 are connected to the fixed contacts "a" thereof so that the input image signal is directly applied to an activity calculator 80. The activity calculator 80 is followed by a quantization step size deciding circuit 81, an orthogonal transform circuit 73, a quantizer 74, and an encoder 75. The circuits and devices 73, 74, 75, 80, and 81 are similar to those in the prior art apparatus of FIG. 1. The reference-frame image signal is processed by the circuits and devices 73, 74, 75, 80, and 81, being converted into corresponding words of given-format code which are outputted from the encoder 75. The encoder 75 also encodes quantization control information into corresponding words of the given-format code, and outputs the code words. The reference-frame code words are transmitted from the encoder 75 to a suitable device (not shown) via a mixer 78.

The prior art apparatus of FIG. 2 includes a switch 62 connected between the fixed contact "a" of the switch 61 and frame memories (FM) 66 and 67. Thus, the switch 62 receives the reference-frame input image signal (data representative of images of reference frames) via the switch 61.

The switch 62 is changed at a period corresponding to four frames, alternately storing the reference-frame image data into the frame memories 66 and 67.

During a period where the input signal represents an image in a non-reference frame (a frame 32, 33, or 34 in FIG. 3), the movable contacts of the switches 61 and 72 are connected to the fixed contacts "b" thereof so that the input image signal is applied to a series combination of frame memories (FM) 63, 64, and 65. Input data representative of images of non-reference frames (frames 32, 33, and 34 in FIG. 3) are sequentially stored in the frame memories 63, 64, and 65.

The prior art apparatus of FIG. 2 includes a motion estimator 69. The motion estimator 69 receives data representative of an image of a non-reference frame from the frame memory 63. In addition, the motion estimator 69 receives data representative of images of reference frames from the frame memories 66 and 67. The motion estimator 69 processes the received image data while dividing a frame into a set of blocks each having, for example, 8 by 8 pixels. The motion estimator 69 calculates motion vectors of the respective blocks of the image of the non-reference frame with respect to the image of the reference frame which immediately precedes or follows the previously-mentioned non-reference frame.

A motion compensator 68 is informed of the calculated motion vectors by the motion estimator 69. The motion compensator 68 receives the data representative of the image of the non-reference frame from the frame memory 63. In addition, the motion compensator 68 receives the data representative of the images of the reference frames from the frame memories 66 and 67. The motion compensator 68 executes block-by-block data processing. Specifically, for each block of a non-reference frame (frames 32, 33, and 34 in FIG. 3), the motion compensator 68 calculates predicted image data Pa from the image data of the immediately-preceding reference frame (a frame 31 in FIG. 3) according to the motion-vector information. In addition, the motion compensator 68 calculates predicted image data Pb from the image data of the immediately-following reference frame (a frame 35 in FIG. 3) according to the motion-vector information. Furthermore, the motion compensator 68 calculates predicted image data Pc on the basis of an average between the predicted image data Pa and the predicted image data Pb. For each of the blocks of the non-reference frame, the motion compensator 68 selects one of the predicted image data Pa, the predicted image data Pb, and the predicted image data Pc which has a greatest correlation. The motion compensator 68 outputs the selected predicted image data to a subtracter 70. In addition, the motion compensator 68 outputs information of the selected predicted image data to an encoder 77.

The subtracter 70 also receives the data representative of the image of the non-reference frame, that is, the input image data of the non-reference frame, from the frame memory 63. The subtracter 70 calculates a difference (a prediction error) between the input image data and the predicted image data of the non-reference frame, and outputs data of the calculated prediction error to a filter 71. The filter 71 limits the prediction-error signal to fixed frequency-band characteristics.

Output data from the filter 71 which represents the prediction error of the non-reference frame is fed to the activity calculator 80. The activity calculator 80 calculates an activity of each block represented by the output data from the filter 71. The activity is a quantity representing an image complexity of a block of a frame. The activity calculator 80 informs the quantization step size deciding circuit 81 of the calculated activity.

The quantization step size deciding circuit 81 receives information of an average quantization step size from an encoding controller (not shown). This circuit 81 decides a quantization step size on the basis of the average quantization step size and the activity for each block. Thus, the decided quantization step size depends on the activity. The quantization step size deciding circuit 81 informs the quantizer 74 of the decided quantization step size as quantization control information.

In addition, the output data from the filter 71 is subjected to orthogonal transform by the orthogonal transform circuit 73. The orthogonal transform circuit 73 outputs data representative of transform coefficients to the quantizer 74. The quantizer 74 quantizes the transform coefficient data with the quantization step size informed by the quantization step size deciding circuit 81. The quantizer 74 outputs quantization-resultant data and the quantization control information to the encoder 75. The quantization-resultant data and the quantization control information are encoded by the encoder 75 into corresponding words of the given-format code. The encoder 75 outputs the code words to the mixer 78.

The encoder 77 receives output data from the motion estimator 69 which represents the calculated motion vectors. In addition, the encoder 77 receives the information of the selected predicted image data from the motion compensator 68 which is referred to as selected mode information. The motion vector information and the selected mode information are encoded by the encoder 77 into corresponding words of the given-format code. The encoder 77 outputs the code words to the mixer 78. The mixer 78 combines the output code words from the encoders 75 and 77 into multiplexed code data, and transmits the multiplexed code data to the suitable device (not shown).

In the prior art apparatus of FIG. 2, predetermined categories corresponding to different quantization step sizes are related with the magnitude of an activity, and weighting values are predetermined in one-to-one correspondence with the categories respectively. As understood from the previous description, input image data of a reference frame is subjected to intra-frame processing while input image of a non-reference frame is subjected to inter-frame processing. For intra-frame processed image data, activities are calculated from the input image data, and blocks of the input image data are classified into corresponding categories according to the calculated input-image activities. For inter-frame processed image data, activities are calculated from the prediction error data, and blocks are classified into corresponding categories according to the calculated prediction-error activities. The average quantization step size for a frame to be encoded is multiplied by the weighting values corresponding to the categories into which the blocks are classified, and thereby the quantization step sizes for the blocks are calculated respectively.

In both the prior art apparatus of FIG. 1 and the prior art apparatus of FIG. 2, changing the quantization step size with the activity is intended to enable data compression while maintaining a good image quality. However, in the prior art apparatus of FIG. 2, for inter-frame processed image data, since the activities are calculated from the prediction error data rather than the input image data and the prediction error data does not directly represent an actually-reproduced image, the above-mentioned purpose of changing the quantization step size with the activity tends to be insufficiently achieved.

As understood from the previous description, such a problem in the prior art apparatus of FIG. 2 is caused by changing the quantization step size in response to only the prediction-error activity during the processing of image data of a non-reference frame.

This invention resolves such a problem in the prior art apparatus of FIG. 2 by changing a quantization step size in response to both a prediction-error activity and an input-image (original-image) activity during the processing of image data of a non-reference frame. An embodiment of this invention will now be described in detail.

Figure 4:
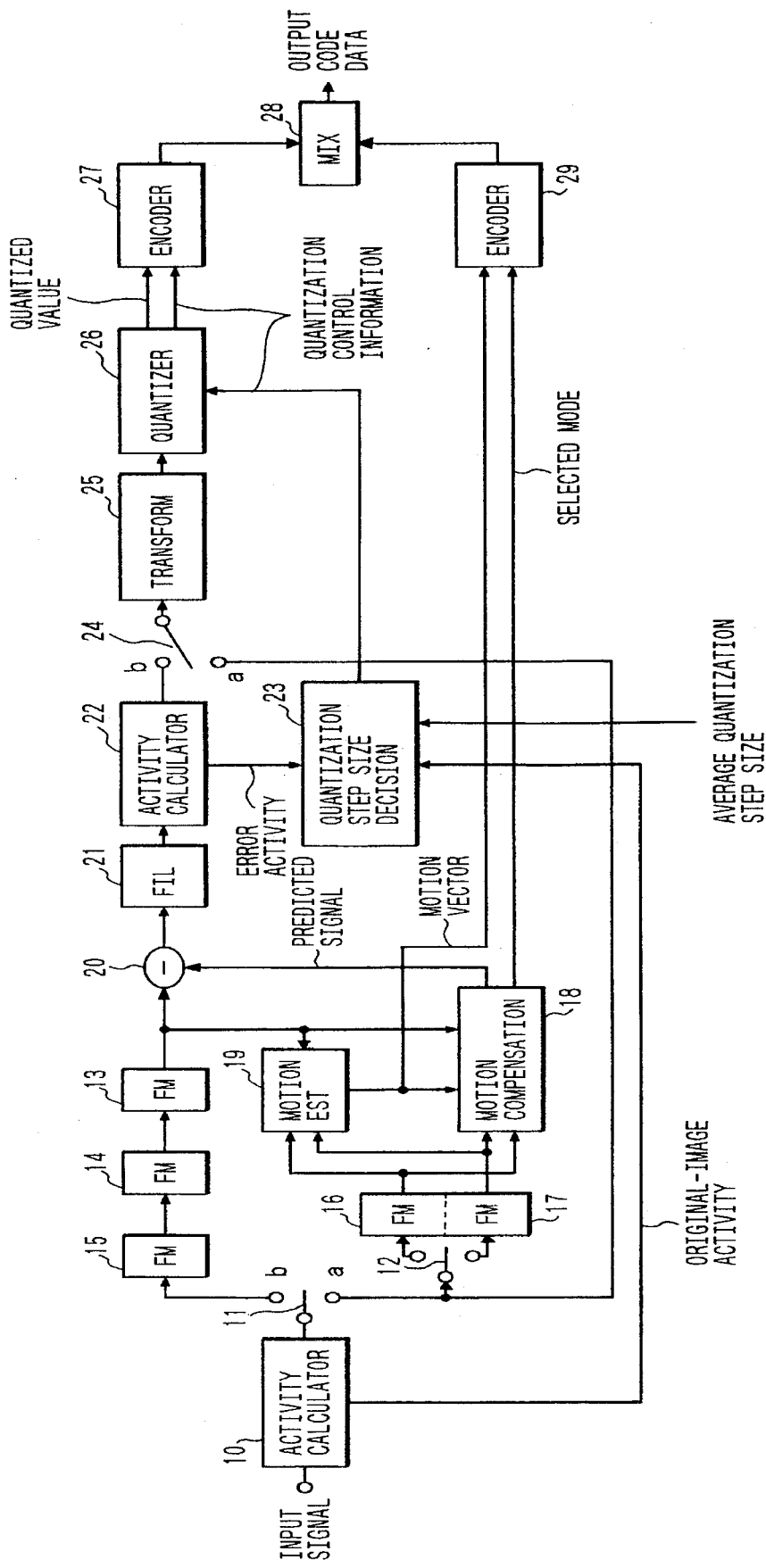
FIG. 4 is a block diagram of an image-signal encoding apparatus according to an embodiment of this invention.

FIG. 4 shows an image-signal encoding apparatus of a predictive encoding type according to an embodiment of this invention. Similarly to the prior art apparatus of FIG. 2, the apparatus of FIG. 4 executes such encoding that, as shown in FIG. 3, reference frames 31 and 35 are set every four frames in a frame sequence and images in the reference frames 31 and 35 are subjected to intra-frame encoding. In addition, images in frames 32, 33, and 34 between the reference frames 31 and 35 are subjected to inter-frame encoding. Frames between reference frames are referred to as non-reference frames.

The apparatus of FIG. 4 includes an activity calculator 10 receiving an input image signal (input image data). The activity calculator 10 processes the input image data while dividing a frame into a set of blocks each having, for example, 8 by 8 pixels. The activity calculator 10 calculates an activity for each block. The activity is a quantity representing a complexity of an image represented by the input image signal. Specifically, in the activity calculator 10, the input image data is subjected to orthogonal transform, and transform-resultant coefficients are weighted in view of visual characteristics to derive weighting-resultant coefficients. In addition, the sum of the absolute values of the weighting-resultant coefficients is calculated, and the activity is decided on the basis of the calculated sum. Alternatively, the activity calculator 10 may include a filter for selecting components of the input image signal which lie in a given frequency band, and the sum of the absolute values of output data from the filter is calculated and the activity is decided on the basis of the calculated. The activity calculator 10 informs a quantization step size deciding circuit 23 of the calculated activity.

The apparatus of FIG. 4 includes switches 11 and 24 each having a movable contact and fixed contacts "a" and "b". The movable contact of the switch 11 receives the input image data via the activity calculator 10. The fixed contact "a" of the switch 11 is connected to the fixed contact "a" of the switch 24. The fixed contact "b" of the switch 11 is connected to the input terminal of a frame memory (FM) 15. The fixed contact "b" of the switch 24 leads from the output terminal of an activity calculator 22. The movable contact of the switch 24 is connected to an orthogonal transform circuit 25.

In the apparatus of FIG. 4, during a period where the input data represents an image in a reference frame (a frame 31 or 35 in FIG. 3), the movable contacts of the switches 11 and 24 are connected to the fixed contacts "a" thereof so that the input image signal is directly applied to the orthogonal transform circuit 25. In this case, the input image signal is subjected to orthogonal transform by the circuit 25. The orthogonal transform circuit 25 outputs data representative of transform coefficients to a quantizer 26. The quantizer 26 quantizes the transform coefficient data with a quantization step size informed by the quantization step size deciding circuit 23. The information of the quantization step size is referred to as quantization control information. The quantizer 26 outputs quantization-resultant data and the quantization control information to an encoder 27. The quantization-resultant data and the quantization control information are encoded by the encoder 27 into corresponding words of given-format code. The encoder 27 outputs the code words. The reference-frame code words are transmitted from the encoder 27 to a suitable device (not shown) via a mixer 28.

The apparatus of FIG. 4 includes a switch 12 connected between the fixed contact "a" of the switch 11 and frame memories (FM) 16 and 17. Thus, the switch 12 receives the reference-frame input image signal (data representative of images of reference frames) via the switch 11. The switch 12 is changed at a period corresponding to four frames, alternately storing the reference-frame image data into the frame memories 16 and 17.

During a period where the input signal represents an image in a non-reference frame (a frame 32, 33, or 34 in FIG. 3), the movable contacts of the switches 11 and 24 are connected to the fixed contacts "b" thereof so that the input image signal is applied to a series combination of frame memories (FM) 13, 14, and 15. Input data representative of images of non-reference frames (frames 32, 33, and 34 in FIG. 3) are sequentially stored in the frame memories 13, 14, and 15.

The apparatus of FIG. 4 includes a motion estimator 19. The motion estimator 19 receives data representative of an image of a non-reference frame from the frame memory 13. In addition, the motion estimator 19 receives data representative of images of reference frames from the frame memories 16 and 17. The motion estimator 19 processes the received image data while dividing a frame into a set of blocks each having, for example, 8 by 8 pixels. The motion estimator 19 calculates motion vectors of the respective blocks of the image of the non-reference frame with respect to the image of the reference frame which immediately precedes or follows the previously-mentioned non-reference frame.

A motion compensator 18 is informed of the calculated motion vectors by the motion estimator 19. The motion compensator 18 receives the data representative of the image of the non-reference frame from the frame memory 13. In addition, the motion compensator 18 receives the data representative of the images of the reference frames from the frame memories 16 and 17. The motion compensator 18 executes block-by-block data processing. Specifically, for each block of a non-reference frame (frames 32, 33, and 34 in FIG. 3), the motion compensator 18 calculates predicted image data Pa from the image data of the immediately-preceding reference frame (a frame 31 in FIG. 3) according to the motion-vector information. In addition, the motion compensator 18 calculates predicted image data Pb from the image data of the immediately-following reference frame (a frame 35 in FIG. 3) according to the motion-vector information. Furthermore, the motion compensator 18 calculates predicted image data Pc on the basis of an average between the predicted image data Pa and the predicted image data Pb. For each of the blocks of the non-reference frame, the motion compensator 18 selects one of the predicted image data Pa, the predicted image data Pb, and the predicted image data Pc which has a greatest correlation. The motion compensator 18 outputs the selected predicted image data to a subtracter 20. In addition, the motion compensator 18 outputs information of the selected predicted image data to an encoder 29.

The subtracter 20 receives the data representative of the image of the non-reference frame, that is, the input image data of the non-reference frame, from the frame memory 13. The subtracter 20 calculates a difference (a prediction error) between the input image data and the predicted image data of the non-reference frame, and outputs data of the calculated prediction error to a filter 21. The filter 21 limits the prediction-error signal to fixed frequency-band characteristics.

Output data from the filter 21 which represents the prediction error of the non-reference frame is fed to the activity calculator 22. The activity calculator 22 calculates an activity of each block represented by the output data from the filter 21. The activity is a quantity representing an image complexity of a block of a frame. Specifically, in the activity calculator 22, the output data from the filter 21 is subjected to orthogonal transform, and transform-resultant coefficients are weighted in view of visual characteristics to derive weighting-resultant coefficients. In addition, the sum of the absolute values of the weighting-resultant coefficients is calculated, and the activity is decided on the basis of the calculated sum. The activity calculator 22 informs the quantization step size deciding circuit 23 of the calculated activity.

The quantization step size deciding circuit 23 receives information of an average quantization step size from an encoding controller (not shown). As described previously, the quantization step size deciding circuit 23 receives the information of the calculated activity, that is, the information of the input-image (original-image) activity, from the activity calculator 10. In addition, the quantization step size deciding circuit 23 receives the information of the calculated activity, that is, the information of the prediction-error activity, from the activity calculator 22. The quantization step size deciding circuit 23 calculates or decides a quantization step size on the basis of the average quantization step size, the input-image activity, and the prediction-error activity for each block. Thus, the decided quantization step size depends on the input image activity and the prediction-error activity. The quantization step size deciding circuit 81 informs the quantizer 26 of the decided quantization step size as quantization control information.

In addition, the output data from the filter 21 is transmitted to the Orthogonal transform circuit 25 via the activity calculator 22 and the switch 24, being subjected to orthogonal transform by the orthogonal transform circuit 25. The orthogonal transform circuit 25 outputs data representative of transform coefficients to the quantizer 26. The quantizer 26 quantizes the transform coefficient data with the quantization step size informed by the quantization step size deciding circuit 23. The quantizer 26 outputs quantization-resultant data and the quantization control information to the encoder 27. The quantization-resultant data and the quantization control information are encoded by the encoder 27 into corresponding words of the given-format code. The encoder 27 outputs the code words to the mixer 28.

The encoder 29 receives output data from the motion estimator 19 which represents the calculated motion vectors. In addition, the encoder 29 receives the information of the selected predicted image data from the motion compensator 18 which is referred to as selected mode information. The motion vector information and the selected mode information are encoded by the encoder 29 into corresponding words of the given-format code. The encoder 29 outputs the code words to the mixer 18. The mixer 18 combines the output code words from the encoders 27 and 29 into multiplexed code data, and transmits the multiplexed code data to the suitable device (not shown).

As shown in FIG. 5, the quantization step size deciding circuit 23 includes a memory 51 into which the information of the input-image activity is temporarily stored from the activity calculator 10 (see FIG. 4). The information of the input-image activity is then outputted from the memory 51 to a RAP operator circuit 52 and a MEAN operator circuit 53.

The RAP operator circuit 52 calculates RAP values by processing the input-image activities of a current block (a block of interest) and eight surrounding blocks with a RAP operator which is a matrix composed of nine elements corresponding to the current block and the eight surrounding blocks as shown in FIG. 6. The calculated RAP values agree with differentiation-resultant values.

The MEAN operator circuit 53 calculates MEAN values by processing the input-image activities of the current block and the eight surrounding blocks with a MEAN operator which is a matrix composed of nine elements corresponding to the current block and the eight surrounding blocks as shown in FIG. 7. The calculated MEAN values agree with average/normalization-resultant values.

As shown in FIG. 5, the quantization step size deciding circuit 23 includes an STD normalization circuit 54 which receives data of the calculated RAP values from the RAP operator circuit 52, and which also receives data of the calculated MEAN values from the MEAN operator circuit 53. For each block among the current block and the eight surrounding blocks, the STD normalization circuit 54 calculates an STD value from the RAP value and the MEAN value of the same block by referring to the equation as follows.

STD value=RAP value/MEAN value The calculated STD values denote normalized degrees of variations or ruggednesses (unevennesses) of the eight surrounding blocks with respect to the current block.

Figure 8:
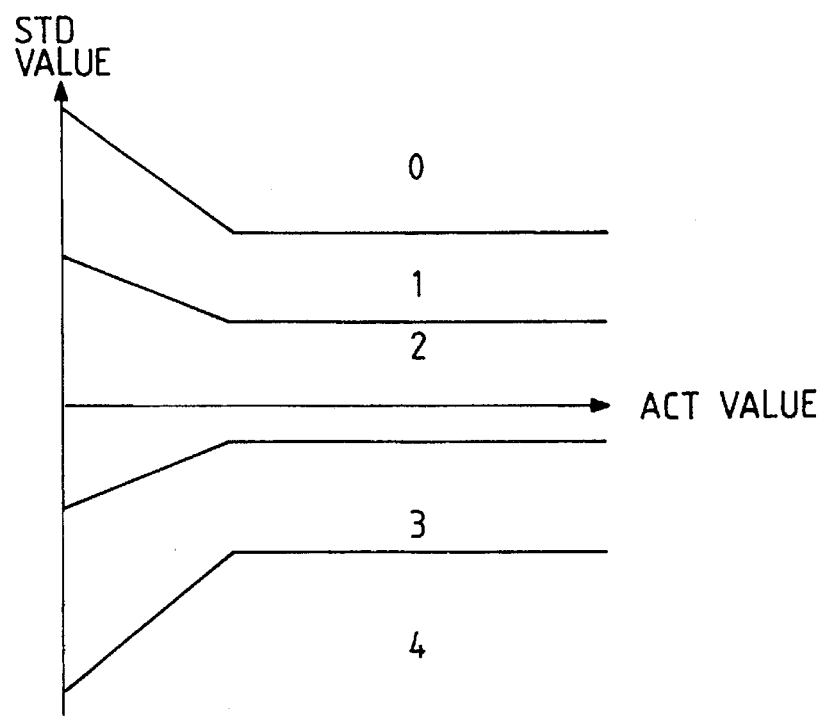
FIG. 8 is a diagram showing the relation among an STD value, an ACT value, and a quantization category in the image-signal encoding apparatus of FIG. 4.

A two-dimensional quantization category deciding circuit 55 receives the data of the input-image activity (referred to as an ACT value) from the memory 51. In addition, the category deciding circuit 55 receives data of the calculated STD value from the STD normalization circuit 54. The category deciding circuit 55 decides a quantization category by selecting one of categories "0", "1", "2", "3", and "4" in response to the input-image activity and the STD value according to predetermined characteristics of intra-frame decision which are shown in FIG. 8. Values of 0, 1, 2, 3, and 4 are assigned to the quantization categories "0", "1", "2", "3", and "4" respectively. In general, a block having a large STD value is higher in activity than blocks surrounding the former block, and such a block is visually important. As shown in FIG. 8, the relation between the STD value and the value of the category is designed so that a block having a larger STD value (a visually-important block) will be smaller in value of the category. Since the quantization step size generally decreases as the value of the category decreases, a block having a larger STD value (a visually-important block) is made to correspond to a smaller quantization step size.

As shown in FIG. 5, the quantization step size deciding circuit 23 includes a switch 57 having a movable contact and fixed contacts "a" and "b". The fixed contact "a" of the switch 57 receives output data from the category deciding circuit 55 which represents the value of the quantization category. The fixed contact "b" of the switch 57 leads from the output terminal of a correction circuit 56. The correction circuit 56 receives the output data from the category deciding circuit 55 which represents the value of the quantization category.

During a period where the image data of an intra-frame (a reference frame) is encoded, the movable contact of the switch 57 is connected to the fixed contact "a" thereof so that the quantization-category data is directly transmitted from the category deciding circuit 55 to a quantization step size generator 58.

Figure 9:
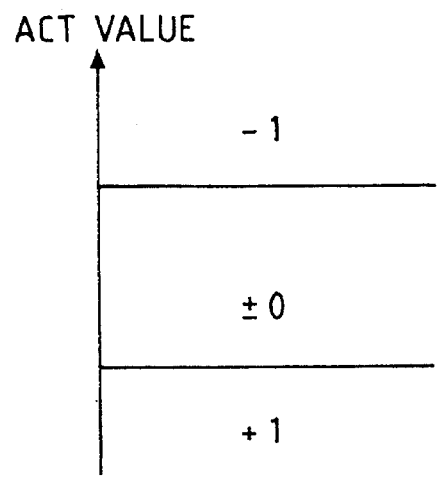
FIG. 9 is a diagram showing the relation between an ACT value and a quantization category in the image-signal encoding apparatus of FIG. 4.

During a period where the image data of an inter-frame (a non-reference frame) is encoded, the movable contact of the switch 57 is connected to the freed contact "b" thereof so that output data from the correction circuit 56 will be transmitted to the quantization step size generator 58. The correction circuit 56 receives the information of the prediction-error activity from the activity calculator 22 (see FIG. 4). As described previously, the correction circuit 56 receives the output data from the category deciding circuit 55 which represents the value of the quantization category. The correction circuit 56 corrects the value of the quantization category in response to the prediction-error activity according to predetermined characteristics of inter-frame decision which are shown in FIG. 9. The correction circuit 56 outputs the data of the correction-resultant value of the quantization category to the quantization step size generator 58 via the switch 57.

The quantization step size generator 58 is also informed of the average quantization step size from the encoding controller (not shown). The quantization step size generator 58 weights the average quantization step size in accordance with the correction-resultant value of the quantization category or the uncorrected value of the quantization category. Specifically, weighting coefficients of 6/8, 7/8, 8/8, 9/8, and 10/8 are assigned to the quantization categories (category values) "0", "1", "2", "3", and "4" respectively. The average quantization step size is multiplied by the weighting coefficient assigned to the correction-resultant value of the quantization category or the uncorrected value of the quantization category so that the average quantization step size will be weighted in accordance with the correction-resultant value of the quantization category or the uncorrected value of the quantization category. For each block, the quantization step size generator 58 produces data of a quantization step size in accordance with the result of the weighting process on the average quantization step size. The quantization step size generator 58 outputs the data of the quantization step size, that is, the quantization control information, to the quantizer 26 (see FIG. 4).

The correction circuit 56 operates so that, during the encoding of the image data of an intra-frame (a non-reference frame), the quantization step size will be corrected toward a smaller side when the prediction-error activity is large, and will be corrected toward a larger side when the prediction-error activity is small. This correction causes the relation between the quantization step size and the prediction-error activity to be reverse in variation slope with respect to the corresponding relation provided in the prior art apparatus of FIG. 2. The relation between the quantization step size and the prediction-error activity in the embodiment of this invention is advantageous for the following reason. In the case of a small prediction error, since images of successive frames highly correlate with each other, quantization errors tend to less adversely affect reproduced images. On the other hand, in the case of a large prediction error, since images of successive frames have a reduced with each other, quantization errors tend to more adversely affect reproduced images. Thus, in the latter case, it is desirable to provide a small quantization step size.

According to the decision of the quantization step size generator 58 in response to the input-image activity, a small step size is used for a visually important portion of the image such as an outline of a foreground portion of the image while a large step size is used for a portion of the image in which a fine picture pattern widely extends. According to the decision of the quantization step size in response to the prediction-error activity, the quantization step size is corrected toward a smaller side in the presence of a large prediction error but is corrected toward a larger side in the presence of a small prediction error. During the encoding of image data of a non-reference frame, the decision of the quantization step size is responsive to both the input-image activity and the prediction-error activity, so that the quantization step size is adaptively controlled in accordance with spatially and temporally responsive visual characteristics.

As understood from the previous description, in the embodiment of this invention, the quantization step size is corrected toward a smaller side for a block having a large prediction-error activity but is corrected toward a larger side for a block having a small prediction-error activity while a quantization step size decided in response to the input-image activity is used as a reference for the correction of the quantization step size.

What is claimed is:

1. An adaptive quantization apparatus for processing an original-image signal representing an original image, comprising:

means for generating a predicted-image signal representing a predicted image for the original image;

means for deriving a difference between the original-image signal and the predicted-image signal, and outputting the derived difference as a prediction error signal;

means for transforming the prediction error signal into a transform-resultant signal;

means for quantizing the transform-resultant signal with variable quantization characteristics;

means for deriving an original-image activity of the original image from the original-image signal;

means for deriving a prediction-error activity from the prediction error signal; and means for controlling the variable quantization characteristics in response to both the original-image activity and the prediction-error activity.

2. The adaptive quantization apparatus of claim 1, wherein the quantizing means comprises means for quantizing the transform-resultant signal with a variable quantization step size, and wherein the controlling means comprises means for determining a reference step size in response to the original-image activity, means for correcting the reference step size into a correction-resultant step size in response to the prediction-error activity, and means for varying the variable quantization step size in accordance with the correction-resultant step size.

3. The adaptive quantization apparatus of claim 2, wherein the controlling means comprises means for decreasing the variable quantization step size as the prediction-error activity increases.

4. An adaptive quantization apparatus for processing an original-image signal representing an original image, comprising:

means for generating a predicted-image signal representing a predicted image for the original image;

means for deriving a difference between the original-image signal and the predicted-image signal, and outputting the derived difference as a prediction error signal;

means for transforming the prediction error signal into a transform-resultant signal;

means for quantizing the transform-resultant signal with a variable quantization step size;

means for deriving an original-image activity of the original image from the original-image signal;

means for deriving a prediction-error activity from the prediction error signal; and means for controlling the variable quantization step size in response to both the original-image activity and the prediction-error activity.

5. An adaptive quantization apparatus for processing an original-image signal representing an original image as a sequence of reference frames wherein each pair of reference frames includes at least one non-reference frame therebetween, the apparatus comprising:

means for generating a predicted-image signal representing a predicted image for the original image;

means for deriving a difference between the original-image signal and the predicted-image signal, and outputting the derived difference as a prediction error signal;

means for transforming the prediction error signal into a transform-resultant signal;

means for quantizing the transform-resultant signal with a variable quantization step size;

means for deriving an original-image activity of the original image from the original-image signal;

means for deriving a prediction-error activity from the prediction error signal; and first control means for controlling the variable quantization step size for a non-reference frame in response to both the original-image activity and the prediction-error activity.

6. The adaptive quantization apparatus of claim 5, further comprising second control means for controlling the variable quantization step size for a reference frame in response to only the original-image activity.

7. An adaptive quantization apparatus for processing an original-image signal representing an original image, comprising:

means for generating a predicted-image signal representing a predicted image for the original image;

means for deriving a difference between the original-image signal and the predicted image signal, and outputting the derived difference as a prediction error signal;

means for transforming the prediction error signal into a transform-resultant signal;

means for quantizing the transform-resultant signal with variable quantization characteristics;

means for deriving an original-image activity of the original image from the original-image signal corresponding to the transform-resultant signal quantized by the quantizing means;

means for deriving a prediction-error activity from the prediction error signal corresponding to the transform-resultant signal quantized by the quantizing means; and means for controlling the variable quantization characteristics in response to both the original-image activity and the prediction-error activity.

8. The adaptive quantization apparatus of claim 7, wherein said variable quantization characteristics comprise a variable quantization step size.

9. An adaptive quantization apparatus for processing an original-image signal representing an original image as a sequence of reference frames wherein each pair of reference frames includes at least one non-reference frame therebetween, the apparatus comprising:

means for generating a predicted-image signal representing a predicted image for the original image;

means for deriving a difference between the original-image signal and the predicted-image signal, and outputting the derived difference as a prediction error signal;

means for transforming the prediction error signal into a transform-resultant signal;

means for quantizing the transform-resultant signal with a variable quantization step size;

means for deriving an original-image activity of the original image from the original-image signal corresponding to the transform-resultant signal quantized by the quantizing means;

means for deriving a prediction-error activity from the prediction error signal corresponding to the transform-resultant signal quantized by the quantizing means; and means for controlling the variable quantization step size for a non-reference frame in response to both the original-image activity and the prediction-error activity.

* * * * *